(12) United States Patent
Murkute et al.

(10) Patent No.: US 7,531,042 B2
(45) Date of Patent: May 12, 2009

(54) METHODS FOR CLEANING AND MAINTAINING MEMBRANE SURFACE DURING FILTRATION

(75) Inventors: Pravin Murkute, Columbia, MD (US); Pavel Tvaruzek, Brno (CZ)

(73) Assignee: Hydranautics, Oceanside, CA (US)

( * ) Notice: Subject to any disclaimer, the term of this patent is extended or adjusted under 35 U.S.C. 154(b) by 127 days.

(21) Appl. No.: 10/740,657

(22) Filed: Dec. 18, 2003

(65) Prior Publication Data

US 2004/0139992 A1 Jul. 22, 2004

Related U.S. Application Data

(60) Provisional application No. 60/435,573, filed on Dec. 19, 2002.

(51) Int. Cl.
*B08B 3/12* (2006.01)
(52) U.S. Cl. ................... 134/1; 210/636; 210/644
(58) Field of Classification Search .............. 134/1; 210/636, 644, 321.79, 321.84, 321.88
See application file for complete search history.

(56) References Cited

U.S. PATENT DOCUMENTS

| | | | |
|---|---|---|---|
| 4,645,542 A * | 2/1987 | Scharton et al. | 134/1 |
| 4,846,976 A * | 7/1989 | Ford | 210/636 |
| 5,092,355 A * | 3/1992 | Cadwell et al. | 134/1 |
| 5,639,373 A | 6/1997 | Mahendran et al. | |
| 5,895,521 A * | 4/1999 | Otsuka et al. | 95/280 |
| 6,159,373 A * | 12/2000 | Beck et al. | 210/636 |
| 6,245,239 B1 * | 6/2001 | Cote et al. | 210/636 |
| 6,550,747 B2 * | 4/2003 | Rabie et al. | 261/23.1 |

OTHER PUBLICATIONS

M. Cheryan, *Ultrafiltration and Microfiltration Handbook*, pp. 274-275 (1998).
J. Mallevialle, Editor, *Water Treatment, Membrane Process*, American Water Works Association Research Foundation et al., pp. 6.44 and 6.45 (1996).

* cited by examiner

*Primary Examiner*—Michael Barr
*Assistant Examiner*—Saeed T Chaudhry
(74) *Attorney, Agent, or Firm*—Panitch Schwarze Belisario & Nadel LLP

(57) ABSTRACT

A method is provided for cleaning a membrane surface or maintaining a clean outside surface of a membrane during a process of outside-in membrane separation to remove suspended solids from a liquid phase. The method involves applying pressurized gas pulses to the membrane surface with individual pulse lengths of about 0.1 to 10 seconds. The pulses may be injected singularly with an interval of about 10 to 1000 seconds between pulses for a total duration of about 0.1 to 1000 hours. Alternatively, the pulses may be injected in clusters of about 2 to 100 pulses with an interval of 50-300% of the pulse length between individual pulses for a total duration of about 10 to 1000 seconds. In a preferred embodiment, both types of pulsation methods are combined in a particular sequence. The expanding gas directed toward the membrane surface in the course of one pulse dissipates energy of up to about 40 kJ/m³. One embodiment of the cleaning method involves backwashing the membrane with a permeate and applying the pressurized gas pulses during the filtration and/or backwashing steps of a filtration cycle.

22 Claims, 7 Drawing Sheets

METHODS FOR CLEANING AND MAINTAINING MEMBRANE SURFACE DURING FILTRATION

CROSS-REFERENCE TO RELATED APPLICATION

This application claims the benefit of provisional application No. 60/435,573, filed Dec. 19, 2002.

BACKGROUND OF THE INVENTION

The fouling of membrane surfaces during membrane filtration often causes a decline in the production of filtered water. Accordingly, various means are traditionally employed to keep membrane surfaces clean and to reduce fouling rates. Most known membrane cleaning techniques employ the principle of increasing cross-flow, i.e., flow in a tangential direction, of the liquid to be filtered relative to the membrane surface to be cleaned. The increased cross-flow causes turbulent flow and increases the shear stresses across the membrane surface, thereby dislodging solids accumulated on the surface.

The efficacy of cleaning using cross-flow filtration may be further improved if the cross-flow consists of a continuous or cyclic two-phase mixture of gas and liquid, with the gas dispersed in the liquid phase in the form of gas bubbles ranging in size from about 0.1 mm to 10 mm. For example, the application of continuous two-phase gas-liquid mixtures is illustrated in the submerged membrane system described in U.S. Pat. No. 5,639,373. The two-phase flow causes additional turbulence and mechanically agitates the membrane surface, resulting in increased shear stress across the membrane surface due to increased relative velocity between the membrane surface and the liquid to be filtered. As a result, the efficacy of cleaning the membrane surface increases.

Alternatively, the cyclic two-phase gas-water flow described in U.S. Pat. No. 6,245,239 increases the cleaning efficiency of the membranes by allowing the liquid to be filtered to cyclically accelerate or decelerate, thus avoiding dead zones in the mass of liquid, which are common in continuous two-phase gas-water flow. Membranes can also be cleaned by the application of injected pressure pulses and low frequency ultrasound (Cheryan M.: *Ultrafiltration and Microfiltration Handbook* (1998) and *Water Treatment Membrane Processes,* Joel Mallevialle, Ed. (1996)). All of these cleaning procedures are advantageous in that they may be performed without the need for interrupting the membrane filtration process.

In contrast, membrane cleaning using backwashing requires that the filtration process be interrupted. Backwashing involves pumping a stream of permeate (filtered liquid) through the membrane wall in a direction opposite to the flow direction during filtration, thereby dislodging the particles deposited on the membrane surface. Air may also be used instead of permeate for backwashing, as described for example in U.S. Pat. No. 6,159,373.

These known methods for cleaning and/or maintaining clean membrane surfaces have several disadvantages. For example, one disadvantage of increasing turbulence and shear stress across a membrane surface by increasing the relative velocity of the filtered liquid with respect to the membrane surface is that significant amounts of energy are required. Significant power consumption is also involved in generating the ultrasonic field strength required to carry out ultrasonic cleaning of a membrane surface. Accordingly, such methods may not be applicable in cases where high relative velocities cannot be applied between the membrane surface and the liquid to be filtered.

Additionally, cleaning methods using two-phase continuous or cyclic gas/liquid flow typically utilize significant quantities of air for aeration and therefore such processes may not be applicable in cases where the liquid to be filtered needs to be maintained under anaerobic conditions. Further, the small size of the gas bubbles and their non-linear movement may cause undesirable foam-formation. The small gas bubbles may get trapped in the matrix of solid particles present in the feed stream, float, and separate from the bulk of the feed stream, resulting in a non-homogeneous feed solution.

Finally, cleaning a membrane surface by permeate or gas backwashing necessitates interruption of the membrane filtration-process, thus resulting in downtime and loss of productivity. The backwashing process is also suitable only for certain membrane types and membrane configurations. For example, plate and frame membranes cannot be backwashed since the backwash pressure may peel the membrane off of the support frame.

Accordingly, there remains a need in the art for an improved, economical method of cleaning and maintaining membrane surfaces which may be performed during filtration and which would be as effective as known cleaning methods, yet applicable to a variety of different membrane configurations, including those maintained under anaerobic conditions.

BRIEF SUMMARY OF THE INVENTION

A method of cleaning a membrane surface or maintaining a clean membrane surface during an outside-in membrane separation process is provided. The method comprises applying pressurized gas pulses having an individual pulse length of about 0.1 to about 10 seconds to an immediate vicinity of the membrane surface to form an aerated volume.

The method may comprise filtering a liquid containing at least one suspended solid to produce a permeate and backwashing the membrane surface with the permeate in addition to applying pressurized gas pulses having an individual pulse length of about 0.1 to about 10 seconds to an immediate vicinity of the membrane surface to form an aerated volume.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

The methods of the present invention are particularly applicable, but not limited, to outside-in membrane separation processes to filter suspended solids from a liquid phase. Such membrane separation processes may include, for example, dead-end membrane separation, semi-dead-end membrane separation, separations with cross (tangential) but non-turbulent feed streams in which the membranes are inside a closed pressurized vessel, and separation processes in which the membranes are submerged in the liquid to be filtered and permeate flow across the membrane is achieved by the application of a negative pressure (vacuum) on the permeate side.

According to the present invention, the methods of cleaning the membrane surface involve removing fouling on an outer surface of the membrane by applying gas pulses to an immediate vicinity of the membrane surface to form an aerated volume. The term "aerated volume" refers to the volume of liquid (substrate) in the tank or reservoir in which the membranes are placed. The gas pulses are preferably applied at pressures of about 10 to 90 pounds per square inch gauge (psig) and at flow rates of about 20 to 300 standard cubic feet per minute (scfm) per square meter of cross-section of aerated volume. The resulting pressurized gas pulses generate an energy dissipation of up to about 40 kJ/m$^3$ of power to the immediate vicinity of the membrane surface.

Figure 1:
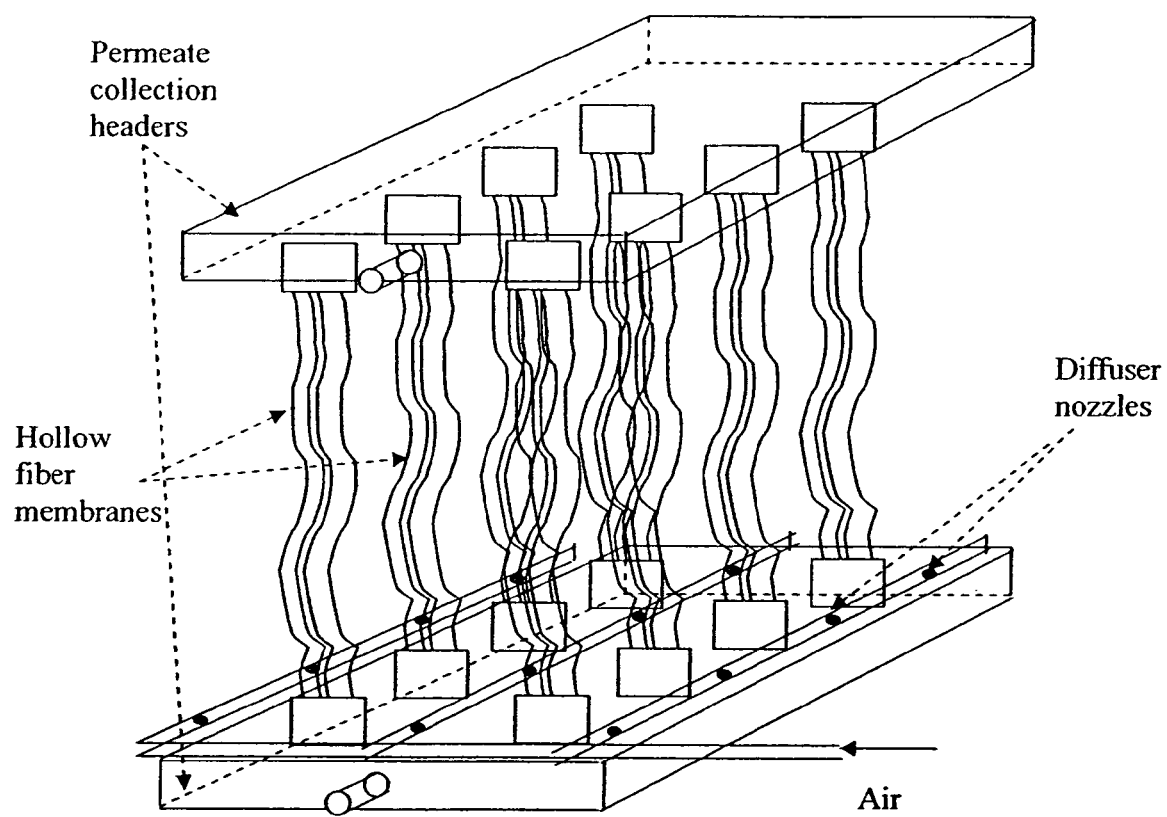
FIG. 1 is a schematic representation of a membrane assembly having vertical membranes for carrying out the method according to the invention.
Figure 2:
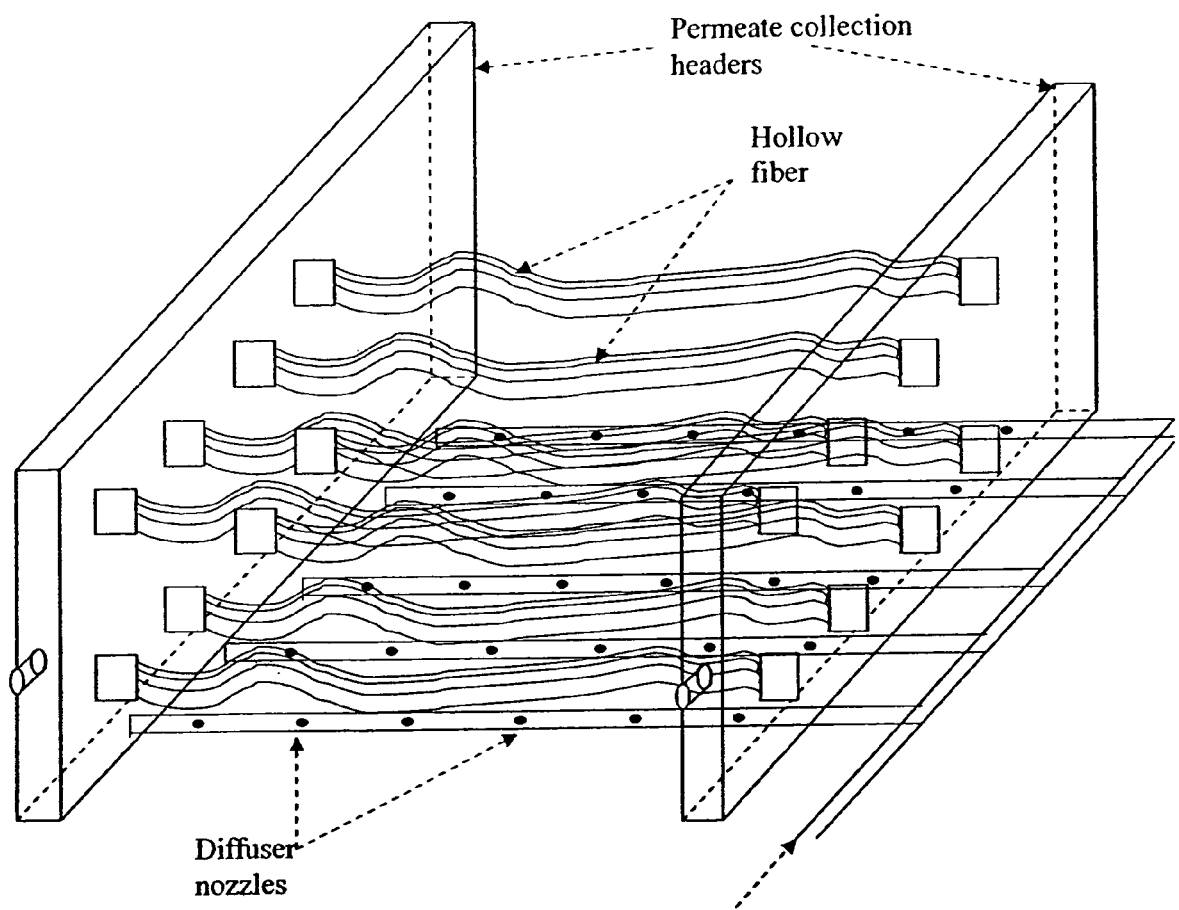
FIG. 2 is a schematic representation of a membrane assembly having horizontal membranes for carrying out the method according to the invention.

It is preferred that the pressurized gas pulses be applied by at least one distributor placed near a lower end of the membrane assembly and oriented at an angle of about 0 to 80° relative to the vertical direction such that the gas pulses are in an upward flow direction. In a preferred embodiment, as shown in FIGS. 1 and 2, the air distributor is a set of parallel pipes or headers that are located in a horizontal plane under the vertically or horizontally oriented membranes, which pipes have openings for air passage. Every row of membranes (if the membranes are oriented vertically) or column of membranes (if the membranes are oriented horizontally) preferably has two aeration headers on either side of it. A single header may have multiple openings, the number of which is determined by the number of individual membrane units for vertically oriented membranes or by the length of the membrane unit for horizontally oriented membranes. The openings on the aeration headers are placed so that the gas flow is vertically upwards and in case of vertically oriented membranes, the flow is preferably directed at an angle of 0 to 80° relative to the vertical direction to ensure aeration of the entire length of the vertically oriented membrane. The distributor preferably has openings of about 0.2 to 7 mm in diameter.

The methods of cleaning according to the invention are effective at removing fouling because the high pressure gas pulses create periodic high-velocity flow of a two-phase gas-liquid mixture across the membrane, which causes violent agitation of the membrane fibers or sheets and thus removes solids deposited on the membrane surface.

The individual pulse length of the pressurized gas pulses is preferably about 0.1 to about 10 seconds in duration. In one embodiment, the pulses according to the invention may be injected singularly with a time interval of about 10 to 1000 seconds between the pulses for a total duration of about 0.1 to 1000 hours over the total life of the membrane. In an alternative embodiment, the pulses may be injected in clusters comprising about 2 to 100 pulses with an interval between the pulses in each cluster of about 50 to 300% of the pulse length, for a total duration of about 10 to 1000 seconds over the total life of the membrane. In a preferred embodiment, a cleaning method involves using both types of pulsation methods in a desired sequence. More specifically, a cleaning process may consist of alternately applying a succession of low frequency and high frequency air pulsation cycles, with the frequency of the gas pulses varied to achieve optimum cleaning effects at minimal gas consumption. The succession of air pulsation cycles is applied during the lifetime or operating time over which the membranes are used for filtration, which may be about one to five years. The low frequency cleaning cycle may have a duration of about 0.1 to 1000 hours and the high frequency pulsation cycle may have a duration of about 10 to 1000 seconds.

Using such pressurized gas pulse parameters, the volume of gas generated may be greater than about ten times the volume of liquid in the multi-phase gas-liquid mixture formed by the expanding gas. Such a high gas/liquid volume ratio, together with the short pulse length, is desirable because it prevents the development of a high interfacial area for mass transfer and the resulting significant dissolution of gas in the liquid, as well as avoiding flotation effects, which may cause an undesirable non-homogeneous feed solution.

The membrane to be cleaned or maintained by the methods of the invention may comprise a hollow fiber, flat sheet, tubular or capillary sheet membrane. The membrane may be submerged in the liquid phase or enclosed in a vessel containing liquid and gas phases with the outer surface of the membrane in contact with the liquid containing the suspended solid. In the latter case, it is preferred that the level of the liquid not completely fill the vessel and that the remainder of the vessel be filled with the gas phase.

Although the method of cleaning using air pulses with or without permeate backwashing, as described below, may be performed during a membrane separation process, it may also be applicable if a particular membrane filtration process needs to be interrupted for chemical cleaning of the membrane surface, also known as clean-in-place or CIP. For such an application, the method of applying pressurized gas pulses may significantly intensify and accelerate the process of chemical cleaning the membrane surface.

The membrane may be held with its longitudinal axis vertical, so that the surface of the membrane is parallel to an upward direction of gas flow. Such a preferred configuration is advantageous because the entire membrane surface is uniformly exposed to the cleaning action of air pulsation. In the case of a hollow fiber membrane, the fibers may also be held orthogonal to the direction of gas flow.

In one embodiment, the methods further comprise contacting the membrane surface with at least one cleaning or washing liquid substantially contemporaneously with applying the pressurized gas pulses. Such liquids may be any cleaning liquids well known to those in the art for use in cleaning fouled membranes during membrane treatment processes. For example, typical cleaning or washing liquids are solutions of acids (e.g., citric acid), alkalis (e.g., caustic soda), and oxidizing agents (e.g., chlorine), all of which may be used with soaps.

According to another embodiment of the invention the application of pressurized gas pulses, as described previously, may be used in combination with a traditional backwashing cleaning method using permeate resulting from membrane filtration. Following the filtration of a liquid containing at least one suspended solid (and typically more than one suspended solid) to produce a permeate, the membrane surface is backwashed with the permeate to clean the membrane. The filtration and backwashing steps may collectively be referred to as a "filtration cycle." Pressurized gas pulses, as previously described, may be applied substantially simultaneously with the filtration and/or the backwashing step in a filtration cycle.

The permeate backwashing step is preferably conducted for about 0.25 to about 5 minutes at the end of each filtration cycle. Backwash flows are preferably about 12 to 80 gfd (gallons per square foot of membrane per day) and backwash pressure is preferably about 3 to 40 psig. In a preferred embodiment, the duration of a filtration step is about 10 to 1440 minutes.

There are several ways to enhance the cleaning effect in the combined cleaning method. For example, one or more cleaning chemicals, as previously described, may be added to the permeate for backwashing the membrane surface. In an alternative embodiment, the permeate backwash may be applied in the form of pressure or flow pulses to further enhance the cleaning effect. If backwash pressure or flow pulsation is employed, the interval between pulses is preferably about 1 to 20 seconds, and the duration of pulses is preferably about 1 to 5 seconds for a total pulsation period of about 0.25 to 5 minutes. The air pulsation clusters may be timed to coincide with the permeate backwash period.

The cleaning achieved by the method of combining air pulsation and backwashing is extremely effective, surprisingly more so than would be expected from the additive combination of the two cleaning methods. Accordingly, such a combined method is particularly useful for cleaning high-fouling substrates, which would otherwise be untreatable by one method alone.

Using the methods according to the invention, the membrane cleaning is effected by the intense agitation caused by energy transfer from the expanding gas pulse to the liquid and the membranes. This agitation results in sudden and rapid acceleration of the membranes and the liquid, which causes high instantaneous relative velocities between the membrane surface and the liquid to be filtered, consequent high shear stresses across the membrane surface, and effective washing off of the solids deposited on the membrane surface. In this invention, the amount of energy transferred by a gas pulse per unit time per unit cross-sectional area of the aerated volume is significantly higher than that in known continuous/cyclic cleaning methods utilizing two-phase gas-liquid flow. The higher energy results from the higher gas pressure (10-80 psig) and gas flow rates used in the method compared with continuous/cyclic cleaning methods, in which the gas pressure typically used is only sufficient to overcome the water head above the gas diffusers and the pressure drop across the holes in the diffuser. The higher pressure and resulting higher rate of energy transfer in the present invention result in more effective cleaning of the membrane surface.

In known cleaning methods utilizing cyclic two-phase gas-liquid flow (such as described in U.S. Pat. No. 6,245,239), the cycle time for the cyclic high/low gas flow does not exceed 120 seconds, and the low flow cycle may be a gas-off condition. In contrast, in the present methods, the gas flow may be turned off for more than 300 seconds. Accordingly, even though the energy transferred by the individual gas pulses is higher in the present methods, the length of the gas pulses is short and the pulses are used infrequently, which results in significantly lower energy cost for gas flow when compared to cleaning methods utilizing continuous/cyclic two-phase gas-liquid flow.

Another advantage of the present methods is that they are applicable for systems in which anaerobic conditions need to be maintained in the liquid to be filtered, such as anaerobic biological treatment of waste water. The high gas/liquid volume ratio in the present method, together with the short pulse length, prevents the development of a high interfacial area for mass transfer and reduces the dissolution of gas in the liquid. Further, since the gas consumption is relatively lower than in traditional cleaning methods utilizing continuous or cyclic two-phase gas-liquid flow, alternate gases such as carbon dioxide or nitrogen, which are typically more expensive than air, can be used. The more traditional methods, using alternate gases such as carbon dioxide or nitrogen, will entail a significantly higher operating cost due to higher gas consumption.

A further advantage of the membrane surface cleaning methods according to the invention is their technological flexibility. The methods enable the setting and variation of a wide range of substantially different cleaning procedure parameters, including pulse length, the interval between pulses, the number of pulses per cluster, and the frequency of clusters, without requiring major technological changes.

Finally, the methods of air pulsation provide the option of cleaning the membrane surfaces without interruption of the filtration process. Additionally, for cleaning high fouling substrates, the combined air pulsation and backwashing method is extremely effective.

The invention will now be described in further detail with respect to the following specific, non-limiting examples:

EXAMPLE 1

A 900 mm long pressure vessel with 200 mm inner diameter (ID) contained 9 bundles of hollow fiber polypropylene (HF PP) membranes with a membrane surface area of 5.5 m$^2$ suspended with their longitudinal axes in the vertical direction. Each bundle contained 1,400 strands of hollow fibers with 0.28 mm outer diameter (OD). At a temperature of 18° C., ferric hydroxide ($Fe(OH)_3$) suspension at a concentration of 1.6 kg Fe/liter was separated by filtration with the liquid substrate circulating inside the pressure vessel at a flow rate of 0.7 liters/second with the direction of flow tangential to the membrane surfaces. A pressure of 220 kPa was maintained inside the pressure vessel as the driving force for filtration. The membrane surfaces were then cleaned using pressurized air (400 kPa) pulses, 1 second long and at a frequency of 15 per hour. This method of membrane cleaning yielded a flux of 130 liters/m$^2$-hour-bar (lmh/bar) after 10 hours of filtration. Without membrane surface cleaning during the course of the filtration, the flux after 10 hours of filtration reached only 19% of the above value. In both cases, the permeate had a silt density index (SDI) of 2.5.

EXAMPLE 2

HF PP in bundles having the same characteristics described in Example 1 were placed in three frames in a 900×700×200 mm compartment. The compartment, containing 30 m$^2$ of HF membranes, was submerged in a tank (containing activated sludge), which was part of a biological treatment system for cleaning waste water from university and veterinary clinic buildings. The activated sludge concentration in the tank reached 4 kg/cubic meter, with a measured sludge volume index of 120 ml/g. In this example, the driving force for membrane filtration was negative pressure (vacuum) inside the hollow fiber (pressure=−20 to −45 kPa. Pressurized air pulses at 400 kPa, 1.5 seconds long were directed from the bottom of the membrane bundles at a frequency of 12 per hour. The flux was measured at 80 lmh/bar immediately after submerging the membranes, which dropped to 35 lmh/bar after 8 hours of operation, and remained at this value for the subsequent five days. Intensive cleaning was conducted after every 24 hours of operation by a cluster of 60 pulses for a total period of 3 minutes.

EXAMPLE 3

Figure 3:
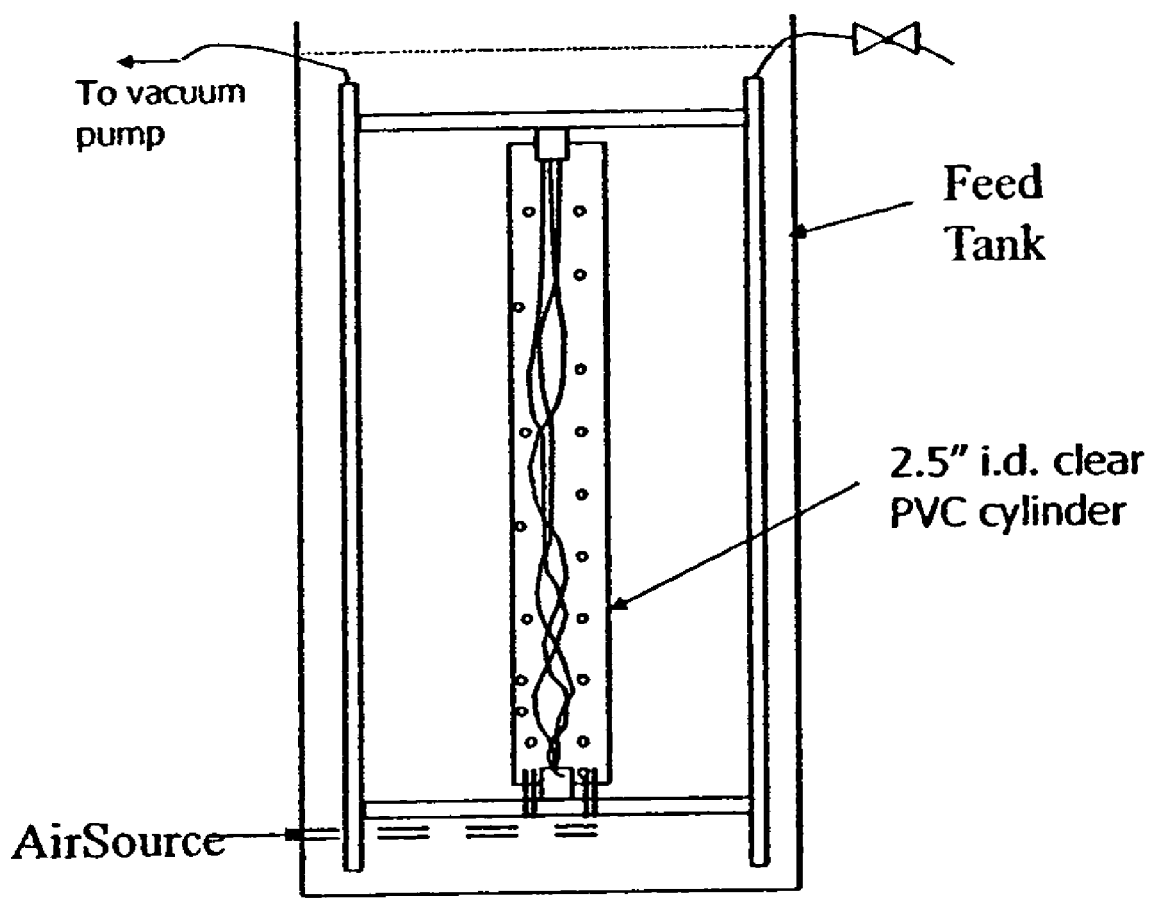
FIG. 3 is a schematic representation of one apparatus for carrying out the method according to the invention.

Bench-scale pilot studies were conducted for filtration of secondary waste water with a membrane module consisting of a single fiber bundle (polypropylene, 0.4 µm pore size, 0.85 m², 705 mm long, 20 mm diameter). The single fiber bundle was surrounded by a clear PVC pipe with 2.5" inner diameter, as shown in FIG. 3. The PVC pipe was included to help contain and direct the energy of the air pulse onto the fiber bundle. The waste water contained biological suspended solids at a concentration of 1200-1500 mg/L. The membrane module was submerged in the feed tank and a positive displacement gear pump was used to draw vacuum inside the fiber lumens. Permeate backwash was carried out with a centrifugal pump and was performed for one minute every thirty minutes at 48 gfd flux.

The process was switched between permeation or backwash modes using a solenoid three-way valve. A PLC (programmable logic controller) was used to control the backwash duration, backwash interval and the frequency of air pulsation for the air pulsation process. These parameters were modifiable using the PLC interface.

Air pulses at a pressure of 60 psig were applied to the submerged fiber bundle with an instantaneous air flow of 2.3 scfm per fiber bundle. Rapid and slow pulsation modes were employed in cyclic fashion. In the rapid pulsation mode, ten air pulses were applied every four seconds for a period of four seconds for a total duration of 80 seconds. In the slow pulsation mode, one air pulse was applied every 5 minutes for a period of 4 seconds for a total duration of 10 hours.

Figure 4:
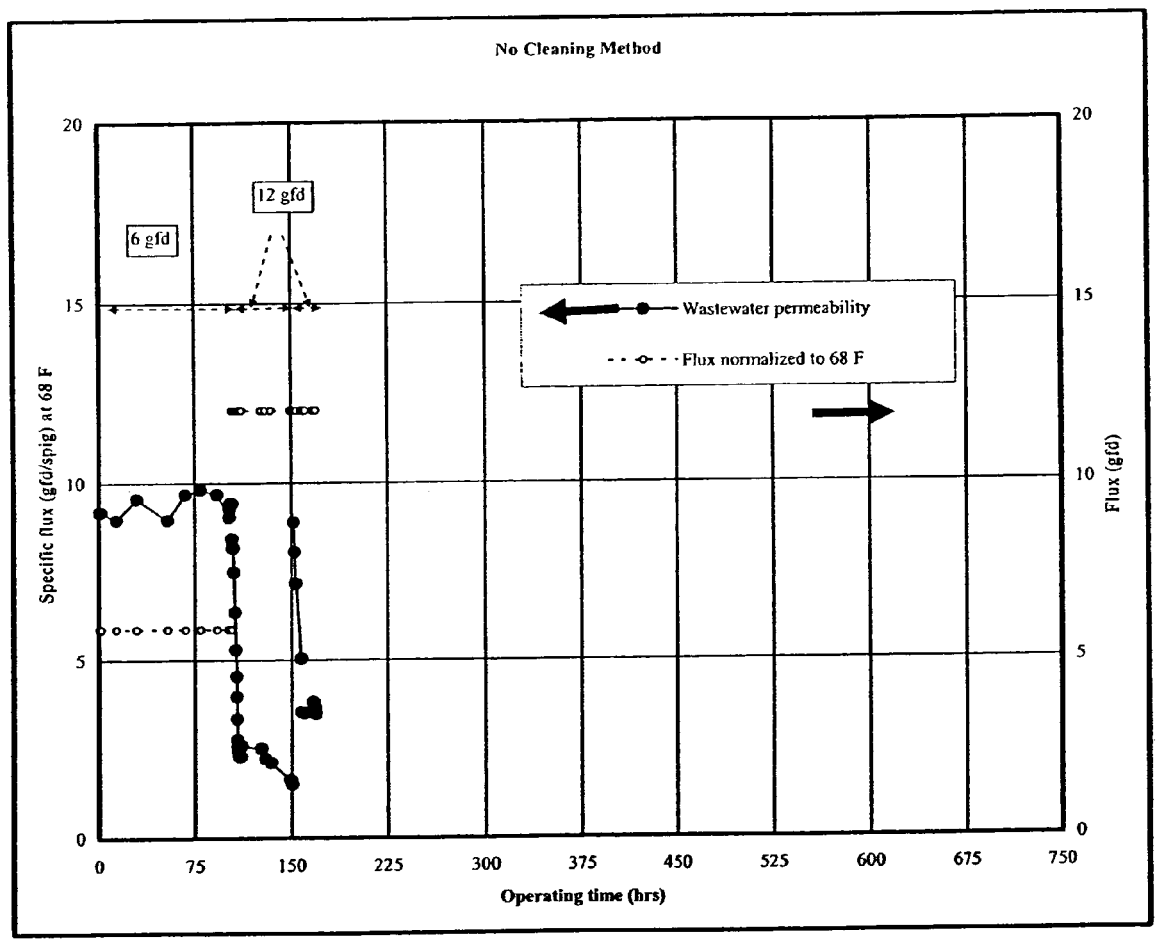
FIG. 4 is a graph of flux versus time for an uncleaned membrane.
Figure 5:
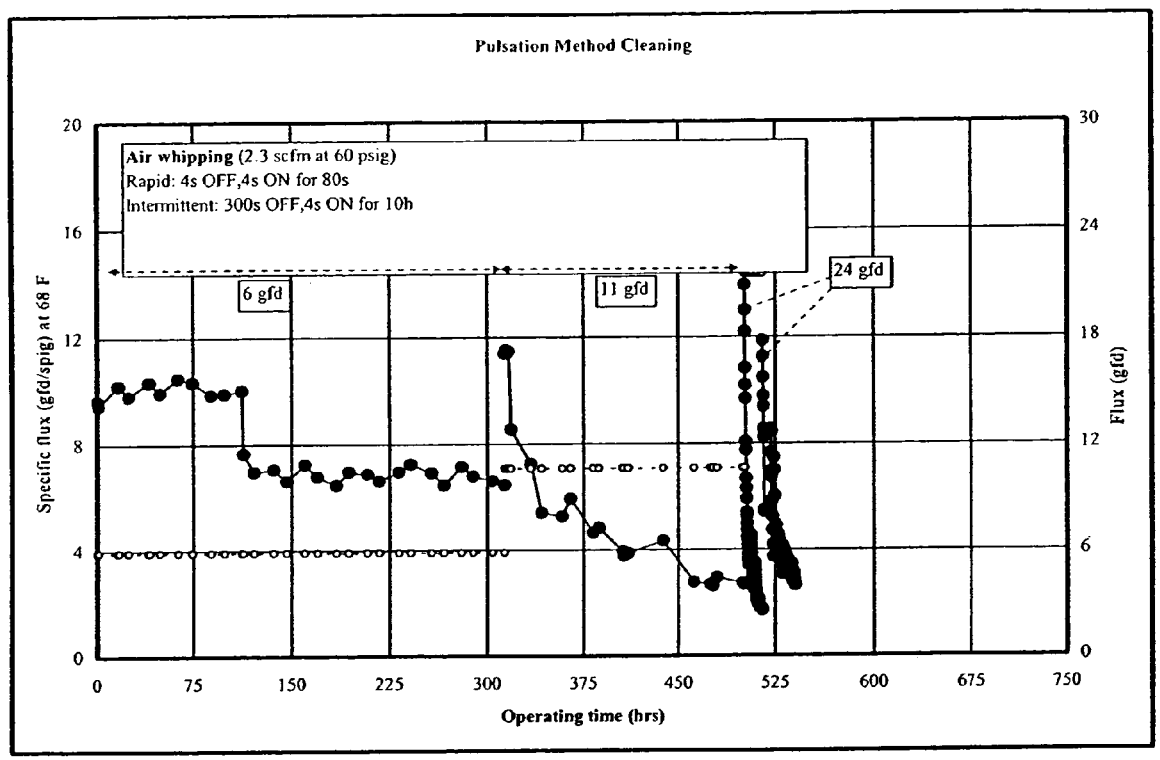
FIG. 5 is a graph of flux versus time for a membrane cleaned using one method of the invention.
Figure 6:
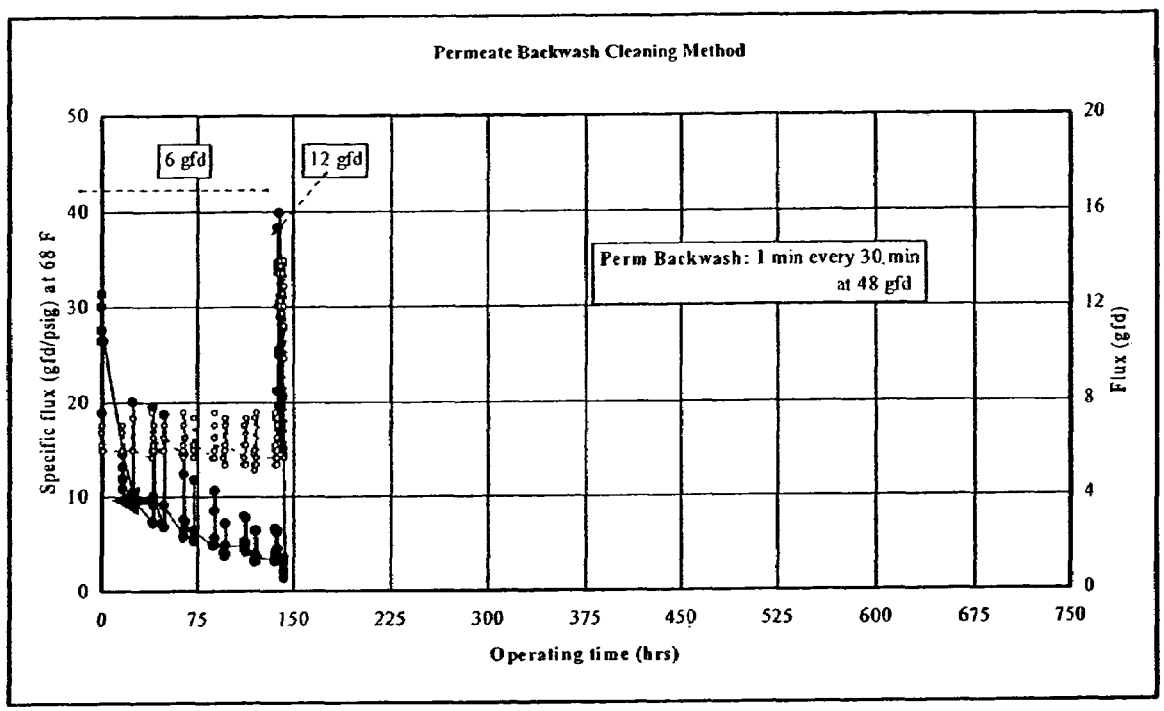
FIG. 6 is a graph of flux versus time for a membrane cleaned using a prior art backwashing method.

The results from these tests are shown graphically in FIGS. 4-6. Each is a plot of flux versus time for the above-described membrane module cleaned under different conditions: no cleaning, air pulsation alone, or backwashing alone. The data for the uncleaned membrane (no air pulsation or backwashing) are plotted in FIG. 4. FIG. 5 depicts data for the membrane cleaned using only air pulsation as the cleaning method. Finally, FIG. 6 shows data when permeate backwash was used as the cleaning method.

From these plots, the fouling rates for each set of conditions may be determined. Specifically, fouling rate is defined as the ratio of decrease in specific flux (Y-axis) with the operating time (X-axis). A higher fouling rate thus indicates a greater decrease in a specific flux for a given operating time. For example, when no cleaning was performed (FIG. 4), the average fouling rate for 12 gfd flux=decrease in specific flux/ operating time=(8.9−3.5)/(169−152)=0.32 gfd/psig/hour. In comparison, the average fouling rate for 11 gfd flux for the air pulsation cleaning method (FIG. 5) was 0.05 gfd/psig/hour, and for the permeate backwash cleaning method (FIG. 6), the average fouling rate was 7.3 gfd/psig/hour. It can thus be seen that air pulsation lowers the fouling rate relative to no cleaning or traditional permeate backwashing.

EXAMPLE 4

Figure 7:
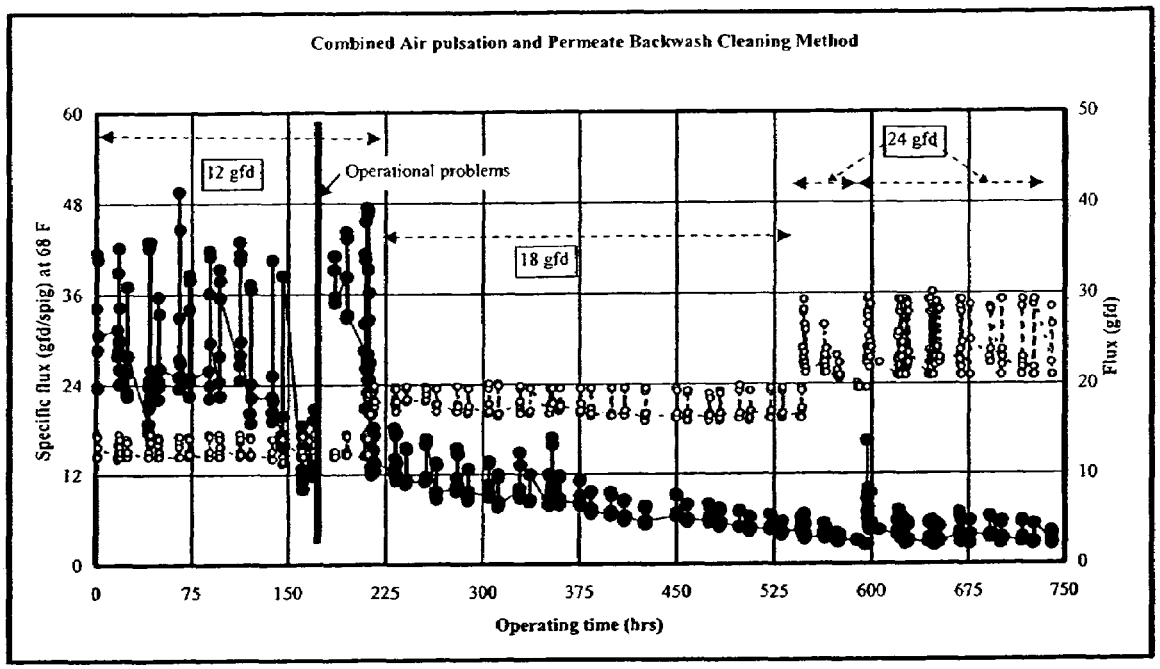
FIG. 7 is a graph of flux versus time for a membrane cleaned using another method of the invention.

Tests were conducted using the same experimental setup as in Example 3. The membrane was cleaned using a combination of air pulsation and permeate backwashing using the same conditions as in Example 3. Air pulsation was performed only during filtration. FIG. 6 depicts the data when only permeate backwashing was used as the cleaning method, and the data for the combined air pulsation/backwashing cleaning method are plotted in FIG. 7.

It can be seen that the fouling rate for 12 gfd flux is significantly lower in case of combined air pulsation and backwash compared with that observed for air pulsation or backwashing alone. Further, the cleaning efficiency observed in the combined air pulsation and backwashing process is significantly higher than what would have been expected from the additive effects of the individual cleaning efficiencies for air pulsation and permeate backwashing.

Additionally, the fouling rate for 24 gfd flux is also significantly lower for the combined air pulsation and backwashing process as compared to the air pulsation process alone.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method of cleaning a membrane surface or maintaining a clean membrane surface during an outside-in membrane separation process, the method comprising applying pressurized gas pulses having an individual pulse length of about 0.1 to about 5 seconds to an immediate vicinity of the membrane surface to form an aerated volume while simultaneously performing a separation process.

2. The method according to claim 1, wherein the pressurized gas pulses exhibit a pressure of about 10 to 90 psig and a flow rate of about 20 to 300 scfm per square meter of a cross section of the aerated volume.

3. The method according to claim 1, wherein the pressurized gas pulses generate an energy dissipation of up to about 40 kj/m3 of power to the immediate vicinity of the membrane surface.

4. The method according to claim 1, wherein the method comprising applying the pressurized gas pulses comprises at least one operation selected from the group consisting of:
(a) injecting the pressurized gas pulses singularly for a total duration of about 0.1 to about 1000 hours, wherein an interval between the pulses is about 10 to 1000 seconds; and
(b) injecting the pressurized gas pulses in clusters comprising about 2 to 100 individual pulses for a total duration of about 0.1 to about 1000 seconds, wherein an interval between the individual pulses in the clusters is about 50 to 300% of a pulse length.

5. The method according to claim 1, wherein the membrane comprises at least one selected from the group consisting of hollow fiber, flat sheet, tubular, and capillary sheet.

6. The method according to claim 1, wherein the method comprises holding the membrane with its longitudinal axis vertical such that the membrane surface is parallel to a direction of gas flow from the pressurized gas pulses.

7. The method according to claim 1, wherein the method comprises holding the membrane with its longitudinal axis horizontal such that the membrane surface is orthogonal to a direction of gas flow from the pressurized gas pulses.

8. The method according to claim 7, wherein the membrane comprises at least one hollow fiber orthogonal to the direction of gas flow from the pressurized gas pulses.

9. The method according to claim 1, wherein applying the pressurized gas pulses to the membrane surface is carried out by at least one distributor having openings of about 0.2 to 7 mm placed near a lower end of the membrane and oriented at an angle of about 0 to 80° with respect to a vertical direction, such that a direction of gas flow from the gas pulses is upward.

10. The method according to claim 1, wherein the membrane is inside a closed, pressurized vessel and the membrane separation process is one selected from the group consisting of a dead-end membrane separation, a semi-dead-end membrane separation, and a separation wherein a liquid to be filtered flows tangentially across the surface of the membrane.

11. The method according to claim 10, wherein the liquid to be filtered comprises a multicomponent liquid containing at least one suspended solid.

12. The method according to claim 1, wherein the method is performed in a closed vessel comprising a liquid phase and a gas phase.

13. The method according to claim 1, further comprising contacting the membrane with a cleaning or washing liquid substantially contemporaneously with applying the pressurized gas pulses.

14. The method according to claim 1, wherein the membrane separation process comprises a step of filtering a liquid containing at least one suspended solid to produce a permeate, further comprising a step of backwashing the membrane surface with the permeate.

15. The method according to claim 14, wherein the method comprises applying the pressurized gas pulses substantially simultaneously with at least one of the filtering and backwashing steps.

16. The method according to claim 14, wherein the backwashing step comprises applying a backwash flow of about 12 to 80 gfd and a backwash pressure of about 3 to 40 psig.

17. The method according to claim 14, wherein a duration of the backwashing step is about 0.25 to 5 minutes.

18. The method according to claim 14, wherein the backwashing step is conducted after each filtering step.

19. The method according to claim 14, wherein a duration of the filtering step is about 10 to 1440 minutes.

20. The method according to claim 14, wherein the method comprises injecting the pressurized gas pulses in clusters simultaneously with the backwashing step.

21. The method according to claim 14, wherein the backwashing step comprises applying the permeate as pressure or flow pulses.

22. The method according to claim 14, wherein the backwashing step further comprises adding at least one cleaning chemical to the permeate for backwashing the membrane surface.

* * * * *